United States Patent
Nambirajan

(10) Patent No.: US 7,548,529 B2
(45) Date of Patent: Jun. 16, 2009

(54) MULTIPLE-ACCESS SCHEME FOR PACKET VOICE THAT USES VOICE ACTIVITY DETECTION

(76) Inventor: Seshadri Nambirajan, 18902 Via Messina, Irvine, CA (US) 92612

( * ) Notice: Subject to any disclaimer, the term of this patent is extended or adjusted under 35 U.S.C. 154(b) by 499 days.

(21) Appl. No.: 11/226,878

(22) Filed: Sep. 14, 2005

(65) Prior Publication Data
US 2006/0013206 A1 Jan. 19, 2006

Related U.S. Application Data

(63) Continuation of application No. 09/618,873, filed on Jul. 19, 2000, now Pat. No. 6,970,442.

(60) Provisional application No. 60/144,535, filed on Jul. 19, 1999, provisional application No. 60/144,469, filed on Jul. 19, 1999.

(51) Int. Cl.
    *H04B 7/212* (2006.01)
(52) U.S. Cl. .................. 370/337; 370/336; 370/437

(58) Field of Classification Search ............... 370/337, 370/336, 437
See application file for complete search history.

(56) References Cited

U.S. PATENT DOCUMENTS 5,513,183 A * 4/1996 Kay et al. ............... 370/337
5,835,486 A * 11/1998 Davis et al. .............. 370/287

FOREIGN PATENT DOCUMENTS

| EP | 0847 220 A | | 6/1998 |
| WO | WO 96/10305 | * | 4/1996 |
| WO | WO 97 24846 | | 7/1997 |
| WO | WO 98 59523 | | 12/1998 |

* cited by examiner

*Primary Examiner*—Jason E Mattis

(57) ABSTRACT

A packet transmission arrangement maintains a certain minimum bandwidth for a call. When a silence period is detected, the bandwidth that is allocated to the call is reduced. When a speech period is detected, the reduced bandwidth remains in force, unless there is spare capacity, in which case a full measure of bandwidth is allocated to the call.

1 Claim, 2 Drawing Sheets

MULTIPLE-ACCESS SCHEME FOR PACKET VOICE THAT USES VOICE ACTIVITY DETECTION

REFERENCE TO RELATED APPLICATIONS

This application is a continuation Ser. No. 09/618,873 filed Jul. 19, 2000 now U.S. Pat. No. 6,970,442, issued Nov. 29, 2005, which claims priority from U.S. Provisional Application No. 60/144,535 and from U.S. Provisional Application No. 60/144,469, both filed on Jul. 19, 1999.

BACKGROUND OF THE INVENTION

This invention relates to packet voice transmission.

Communications networks currently transfer vast quantities of information in both local and wide area networks. The information typically consists of signals representing digitized voice and video as well as data that are transferred between endpoints in networks. A communication path may be established in such networks by circuit switching or by packet switching. In circuit switching, an exclusive channel is established between a sender and a receiver throughout the entire transmission until the connection is released. In packet switching, virtual circuits or channels are established between a sender and a receiver and a channel is only occupied for the duration of the packet's transmission. Such packet switching enables networks to handle the heterogeneous mix of network traffic with varying service requirements and, ideally, packet switching is scalable and can reliably establish and maintain virtual channels without any prespecified rates (so-called bandwidth on demand).

There is currently a significant interest in integrating packet voice in the next generation of broadband data systems in order to provide packet telephony capabilities. The difficulty with establishing packetized voice in the conventional virtual circuit approach described above, is that either delay or clipping is suffered. That is, when a speaker goes silent and the path is released to other users, when the speaker resumes the conversation there may be a period of time during which there is no bandwidth available for the conversation. During such time, the speech signal might be stored and forwarded when bandwidth does become available, or a portion of the speech might be clipped. Neither is a desirable consequence.

SUMMARY OF THE INVENTION

An improvement in the art is achieved with an arrangement where a certain minimum bandwidth is always maintained. When a silence period is detected, the bandwidth that is allocated to the call is reduced. When a speech period is detected, the reduced bandwidth remains in force, unless there is spare capacity, in which case a full measure of bandwidth is allocated to the call.

DETAILED DESCRIPTION

Figure 1:
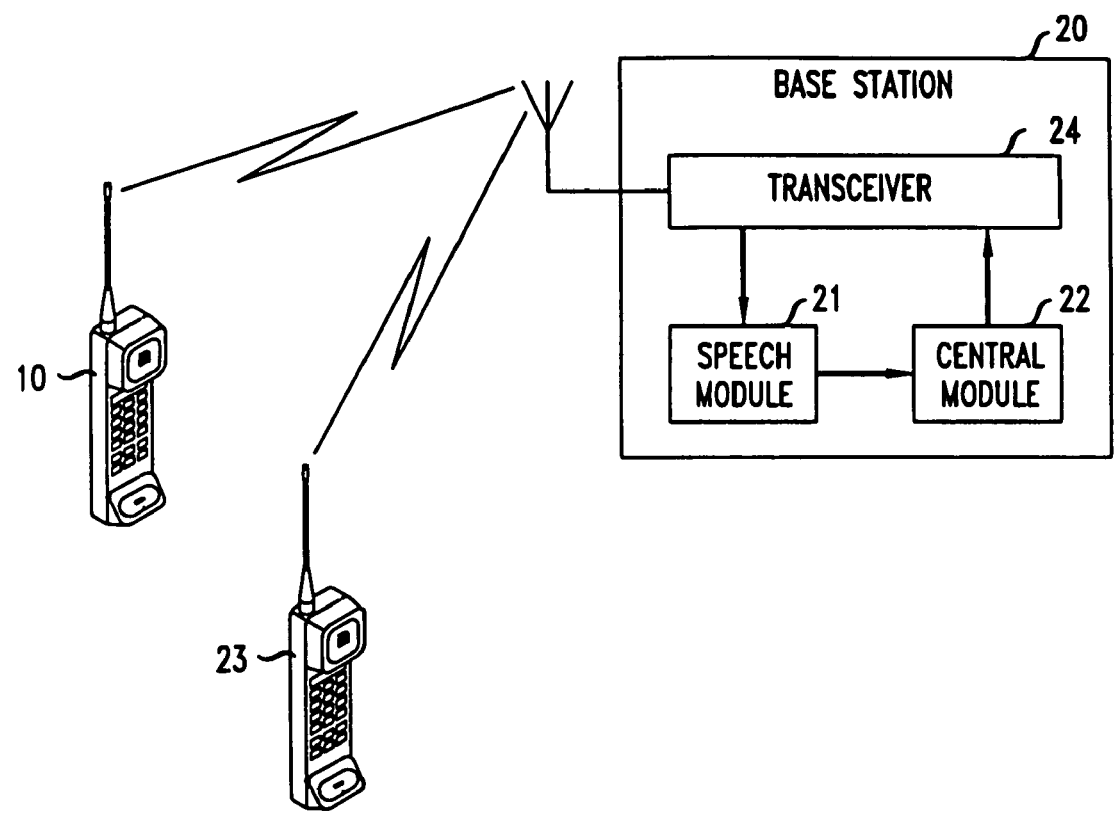
FIG. 1 depicts one environment where the principles of this invention may be practiced.
Figure 2:
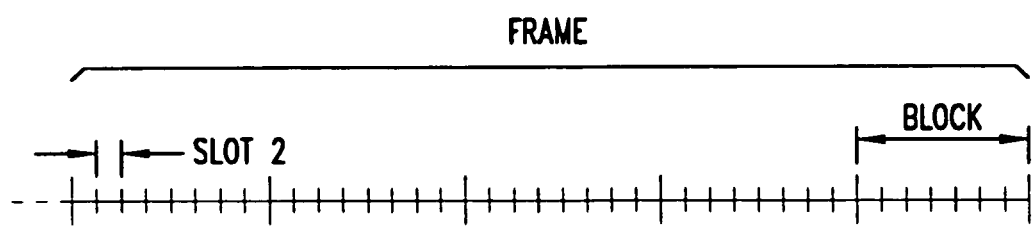
FIG. 2 illustrates 5 signal frames, with slot 2 allocated to phone 10.

FIG. 1 shows a cellular telephony arrangement with a cell phone 10 communicating with base station 20 that includes conventional control circuitry for managing the bandwidth available to base station 20, and for managing the calls from various cellular phones, including phone 10. Consider, for example, a FIG. 1 system where a cell phone communicates with a base station over a specified 200 KHz channel that comprises frames, with eight slots per block and a given number of blocks per frame (e.g., 8). To maintain synchronization among cell phones, the base station sends a frame control signal to which all cell phones synchronize. The voice signal of phone 10 is illustratively encoded by a 13 Kbps coder that adds 9 kbps of error protection and thus develops a 22 kbps signal. Under normal conditions, when the user of phone 10 is speaking, phone 10 is allocated one out of the eight slots of each block. For example, FIG. 2 shows 5 frames, where slot 2 is allocated to phone 10.

Figure 3:
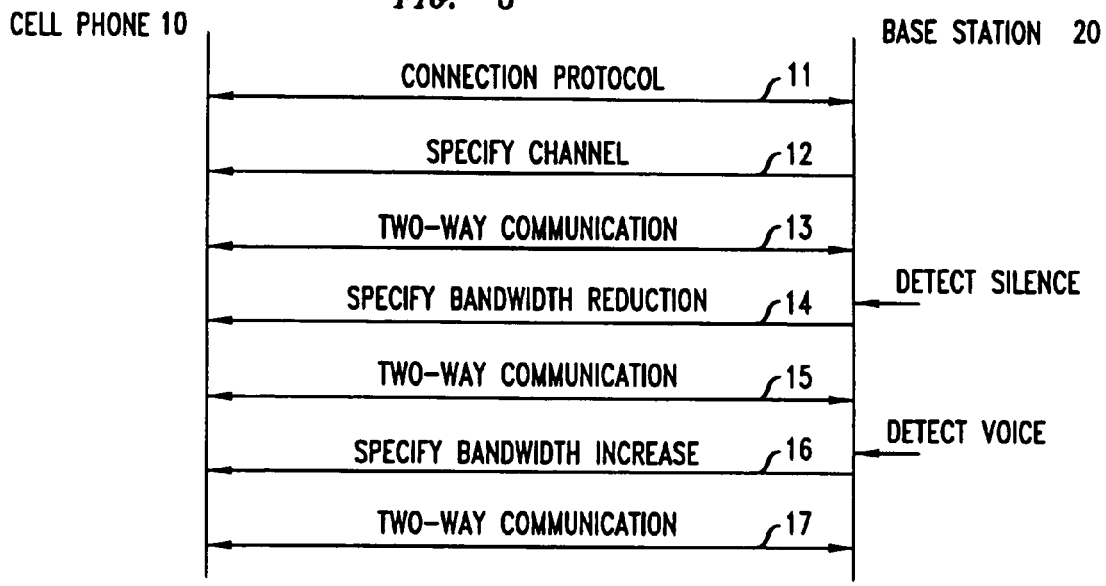
FIG. 3 shows a communication interface chart for an arrangement where bandwidth needs are determined at the base station of the FIG. 1 arrangement.

FIG. 3 shows the communication that takes place between phone 10 and base station 20 when base station 20 includes circuitry for detecting silence periods of a cell phone user.

Line 11 represents the conventional protocol employed for establishing communication between cell phone 10 and base station 20. This includes the protocol that is engaged in when the cell phone requests service and/or when the cell phone is hailed by the base stations. In consequence of the line 11 protocol, in line 12 base station 20 specifies to phone 10 the specific frequency channel and time slot that is available to it for sending packets upstream. Thereafter, two-way communication proceeds (line 13 in FIG. 3) with cell phone 10 sending information to the base station in accordance the FIG. 2 scheme, and base station 20 broadcasting its downstream packets. This is indicated by line 13 in FIG. 3. For purposes of discussion, it is assumed that base station 20 has granted phone 10 its full due bandwidth; to wit, one out of eight time slots in each block of a frame.

In accordance with the FIG. 3 arrangement, base station 20 monitors the signal of phone 10 to determine whether the user has entered a silence period. This monitoring might take one of two forms. In accordance with one approach, the cell phone sends packets that represent whatever background noise exists at the microphone of phone 10, and base station 20 includes module 21 that base station 20 couples to the signal of phone 10. This equipment decodes the signal of cell phone 10 and ascertains whether that signal represents speech, or background noise. Module 21 is realized through conventional modules; for example, circuitry that measures the power contained in the signal. In accordance with another approach, cell phone 10 includes conventional circuitry that detects when its user has entered a silence period and, in response thereto, stops radiating power (not unlike a voice-activated tape recorder). This improves performance of the overall wireless system, in that there is less radiated power to interfere with the transmissions of other cell phones that communicate with base station 20. Of course, the power-measuring circuitry 21 within base station 20 has an easy time of detecting a silence period when the cell phone stops radiating power altogether.

When base station 20 detects a silence period associated with a phone that has a full bandwidth allocation, such as phone 10 in this example, in accordance with the principles disclosed herein that fact is communicated to control circuit 22, and circuit 22 sends a control message 14 to cell phone 10, instructing phone 10 that its allocated bandwidth has been reduced. Illustratively, phone 10 is instructed that only the even-numbered (or the odd-numbered) blocks of a frame, or some other specified fraction of the frame, are henceforth available to phone 10. This control message can have the format of the control message of line 12. The control message 12 might also instruct cell phone 10 to move to another time slot.

Although in the case of a cell phone 10 that refrains from transmitting any power during silence periods the instruction to use only the even blocks of a frame has no effect on the cell phone during the silence period, the effect is felt when cell phone wishes to resume sending a speech signal. Specifically, in accordance with the principles disclosed herein, having received an instruction to use a particular pattern of time slots, when phone 10 receives a voice signal that is to be transmitted to base station 20, it reduces the encoding rate of the speech signal to correspond to the allotted bandwidth specified by message 14, creates packets, and modulates the packets onto the specified 200 KHz channel in the time slot of the specified blocks. This is represented by line 15 in FIG. 3.

Thus, in accordance with the FIG. 3 arrangement, once phone 10 enters a silence period it relinquishes some—but not all—of the communication channel capacity that had been allocated to phone 10. More precisely, base station 20 appropriates (for other uses) some—but not all—of the communication capacity that had been allocated to cell phone 10. Advantageously, the appropriated capacity is sufficient to satisfy the minimum needs of at least one other user, yet not so great as to impose an unduly poor Quality of Service (QoS) on cell phone 10. For example, the appropriated capacity might be ½, or ¾ of the full bandwidth. Indeed, it is expected that base station 20 will use the channel capacity that was relinquished by phone 10, and appropriated by base station 20, for establishing communication for, or to, another cell phone, such as phone 23. It is noted that, in this case, phone 23 is operating at half bandwidth.

The capacity relinquished by phone 10 by going into a silence period is not recovered by phone 10, except by the grace of base station 20. That is, when phone 10 exits its silence period it must encode the speech signal at the lower rate that comports with the specification of message 14. For the example above, if message 14 allots phone 10 only half the capacity, 11 Kbps are available (instead of the 22 Kbps) for communicating information to base station 10 and, thus, 6 Kbps might be used for voice coding, leaving 5 Kbps for error protection. Transmission at this half rate continues, as shown by line 15 in FIG. 3, at least until controller 22 detects that phone 10 is no longer in a silence period but has began transmitting a speech signal. When base station 20 realizes that cell phone 10 is in an active (non-silence) period, it enters a process that attempts to provide cell phone 10 with the full bandwidth that is due to cell phone 10—based on the contracted QoS of cell phone 10. If the slots previously appropriated from cell phone 10 are unoccupied, base station 20 simply sends a command message 16, instructing cell phone 10 to resume encoding in full bandwidth. If the slots previously appropriated from cell phone 10 are occupied with a signal of cell phone 23 (i.e., with a real-time signal) and there are other slots available to which cell phone 23 can be moved, then base station 20 moves cell phone 23, freeing up the slots previously appropriated from cell phone 10. Thence, base station 20 sends command 16 to cell phone 10, instructing it to resume encoding in full bandwidth. If another full bandwidth time slot is available, base station 20 sends a message 16 to cell phone 10 instructing it to move to a new slot and to encode its speech signal in full bandwidth. Message 16 advantageously has the same general format of message 14. Once message 16 is received, phone 10 resumes communicating at the 22 Kbps rate.

Figure 4:
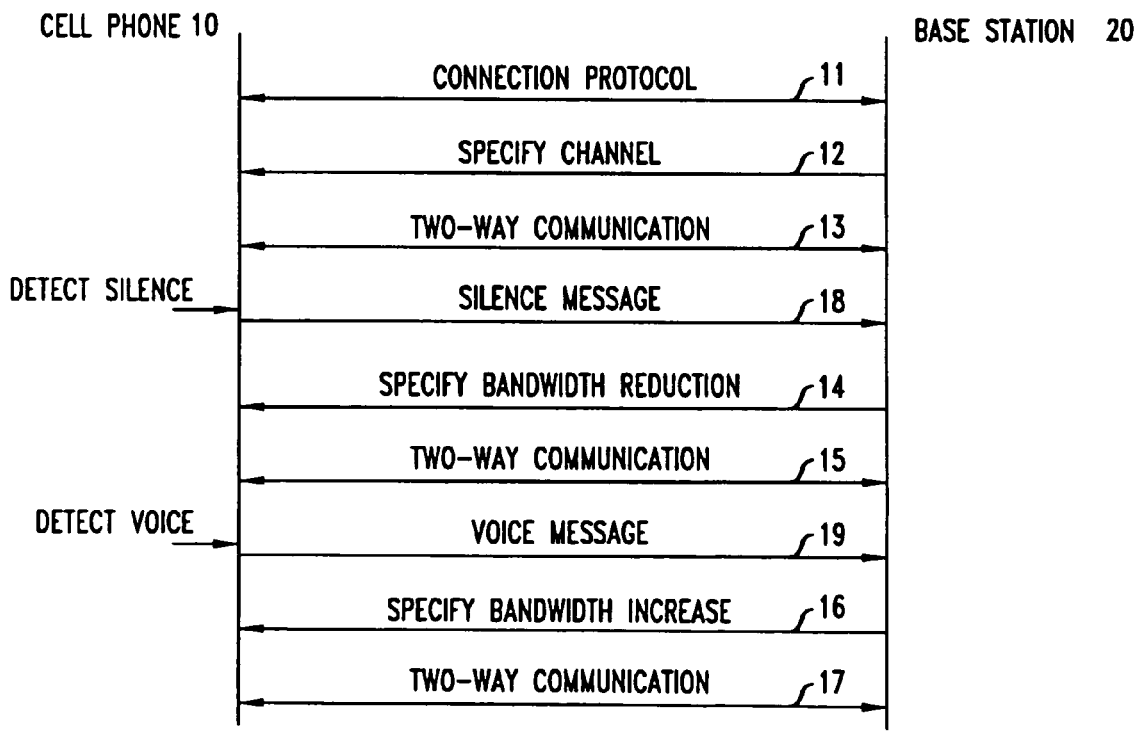
FIG. 4 shows a communication interface chart for an arrangement where bandwidth needs are determined at the base station of the FIG. 1 arrangement.

FIG. 4 shows the communication that takes place between phone 10 and base station 20 when base station 20 operates without module 21 and relies on phone 10 to detect periods of silence or non-silence. FIG. 4 is basically identical to FIG. 3, except that phone 10 is burdened with the need to inform base station 20 when it enters a silence period, and when it entered a non-silence period. This is depicted in FIG. 4 by messages 18 and 19, respectively. In this arrangement, control circuitry 22 receives its information from the cell phone instead of from module 21 but, otherwise, the operation is the same.

The above example discloses a simple schema for reducing the bandwidth; to wit, allotting every even (or odd) block of a frame for a phone in a silence period (½ capacity), or allotting every fourth block of a frame for a phone in a silence period (¼ capacity). It also discloses that the bandwidth that is left for the phone in a silence period should be not smaller than the minimum bandwidth that is needed by a real-time (e.g., voice) user. It further discloses that the bandwidth that is taken away from the phone in a silence period should be not smaller than the minimum bandwidth that is needed by a user. It should be recognized, however, that the first and the third of these illustrative suggestions are not required by the principles disclosed herein.

It is simple and, therefore, convenient for messages 14 and 16 to communicate an instruction such as "drop to even blocks," or "take the odd blocks of slot 2," or "resume full bandwidth." However, there is no prohibition from message 14 instructing "drop blocks 1, 3-5." Also, while it is advantageous to reduce the bandwidth of a phone in a silence period by an amount that is equal to a multiple of a minimum bandwidth of another cellular phone, there is no requirement that the capacity gained by reducing the channel allotted to the phone in a silence period must be allocated to another real-time user.

In fact, when another phone, such as phone 23, is assigned to the channel that is appropriated from cell phone 10 when phone 10 goes into a silence period, a number of considerations arise. First, there is the issue of phone 23 not being given a full bandwidth. Presumably, that consequence is reached because there are no free time slots available for phone 23—if phone 23 is just beginning to communication session, or because phone 23 is in a silence period and is merely being moved. Second, when phone 10 enters a non-silence period and phone 23 occupies half of the time slots, either phone 10 or phone 23 must be moved before cell phone 10 can receive its full due bandwidth. Moreover, unless other time slots are found, both phones continue to operate at a reduced rate.

While these considerations are not very significant, operation of the system is somewhat simplified by using such freed capacity primarily for non-real-time users, who are much less sensitive to capacity being granted to them during silence periods of cell phone 10, and capacity being taken away from them during active periods of cell phone 10.

The above describes the principles of this invention but persons skilled in the art can introduce various modifications and additions without departing from the spirit and scope of the invention. For example, although the disclosure is presented in terms of cell phones communicating with a base station, that is not a limitation of this invention. Also, the method of this invention need not bother to determine whether a cell phone that is at less than full bandwidth is entering a silence period and, conversely, need not bother to determine whether a cell phone that operates at full capacity is entering an active period. Also, the above does not address the issue of an initial connection between a cell phone and base station 20 when there is no capacity for a full bandwidth connection. It should be understood by skilled artisans, however, that the principles of this invention apply, and a connection can be established at less than full bandwidth, in accordance with the above disclosure.

The invention claimed is:

1. A method, executed in a control node of a system, for controlling bandwidth of communication from a station to a destination module, where said station sends packets that carry a voice signal in a channel specified by said control node, comprising the steps of:
   a) first ascertaining whether said station is in a silence period;
   b) when said step of first ascertaining concludes that said station is in a silence period, sending a control message to said station that reduces bandwidth of said channel;
   c) second ascertaining based on said voice signal whether said station is in an active period;
   d) when said step of second ascertaining determines that said station is in an active period, determining whether there is excess capacity that can be assigned to said station; and
   e) sending a control message to said station that increases said bandwidth of said channel when said step of determining concludes that there is excess capacity that can be assigned to said station where:
   said station communicates its packets in time slots assigned by said control node, where the assigned packets recur at a given rate;
   said time slots form frames having a first preselected number of blocks, with each block having a second preselected number time slots, and;
   said control message that reduces bandwidth of said channel specifies blocks in said frame that no longer are permitted to be used for communicating data from said station, or blocks that continue to be permitted to be used for communicating data from said station, thereby the system gaining freed capacity; and
   said number of blocks that continue to be permitted to be used for communicating data from said station is not less than a quarter of said number of blocks that form said frame.

* * * * *